United States Patent
Arnold et al.

(10) Patent No.: US 10,197,209 B2
(45) Date of Patent: Feb. 5, 2019

(54) HIGH-STRENGTH, WATERTIGHT PIPE LINING

(71) Applicant: Fyfe Co. LLC, San Diego, CA (US)

(72) Inventors: Scott Arnold, Solana Beach, CA (US); Jon Whitledge, San Diego, CA (US); Reymundo Ortiz, San Diego, CA (US)

(73) Assignee: Fyfe Co., LLC, San Diego, CA (US)

( * ) Notice: Subject to any disclaimer, the term of this patent is extended or adjusted under 35 U.S.C. 154(b) by 512 days.

(21) Appl. No.: 14/799,008

(22) Filed: Jul. 14, 2015

(65) Prior Publication Data

US 2016/0010785 A1    Jan. 14, 2016

Related U.S. Application Data

(60) Provisional application No. 62/024,240, filed on Jul. 14, 2014.

(51) Int. Cl.
*F16L 55/165*     (2006.01)
*F16L 57/02*      (2006.01)
(Continued)

(52) U.S. Cl.
CPC ............... *F16L 57/02* (2013.01); *B32B 1/08* (2013.01); *B32B 5/02* (2013.01); *B32B 5/024* (2013.01);
(Continued)

(58) Field of Classification Search
CPC . F16L 55/165; F16L 55/1651; F16L 55/1652; F16L 55/1653; F16L 55/1654; F16L 55/168
(Continued)

(56) References Cited

U.S. PATENT DOCUMENTS 3,459,014 A    8/1969  Berning
3,520,749 A    7/1970  Rubenstein
(Continued)

FOREIGN PATENT DOCUMENTS

DE    2753669 A1    10/1978
DE    4403370 A1    8/1995
(Continued)

OTHER PUBLICATIONS

Trenchless Technology, CIPP of Leaking High-Pressure Gas main, Oct. 2011, 4 pages.
(Continued)

*Primary Examiner* — Sunil Singh
(74) *Attorney, Agent, or Firm* — Stinson Leonard Street LLP

(57) ABSTRACT

In a method of reinforcing a pipe, a water penetration resistant layer and strengthening layer of fibrous material are impregnated with a curable polymer, positioned in a lining position near the pipe, and cured to form a water penetration resistant liner and a strengthening liner. The two layers can be impregnated and positioned separately or at once, for example, as a composite liner. Together, the liners provide a waterproof barrier and structural reinforcement to the resulting pipe. In a method of waterproofing a reinforced pipe, a water penetration resistant layer is impregnated with curable polymer, positioned over a previously installed reinforcing liner, and cured to form a waterproof barrier inhibiting ground water egress into the pipe. In certain embodiments of the methods, the water penetration resistant layer includes fibers woven in one of a satin weave and a twill weave.

20 Claims, 9 Drawing Sheets

(51) Int. Cl.
- *B32B 1/08* (2006.01)
- *F16L 55/175* (2006.01)
- *F16L 58/10* (2006.01)
- *B32B 5/02* (2006.01)
- *B32B 5/22* (2006.01)
- *B32B 5/24* (2006.01)
- *B32B 5/26* (2006.01)
- *B29D 23/00* (2006.01)
- *B29C 35/02* (2006.01)
- *B29C 35/08* (2006.01)

(52) U.S. Cl.
CPC .............. *B32B 5/22* (2013.01); *B32B 5/24* (2013.01); *B32B 5/26* (2013.01); *F16L 55/1656* (2013.01); *F16L 55/175* (2013.01); *F16L 58/1036* (2013.01); *F16L 58/1081* (2013.01); *B29C 35/02* (2013.01); *B29C 2035/0827* (2013.01); *B29D 23/001* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2307/202* (2013.01); *B32B 2307/204* (2013.01); *B32B 2307/50* (2013.01); *B32B 2307/7265* (2013.01); *B32B 2597/00* (2013.01)

(58) Field of Classification Search
USPC .......... 138/97–99, 140, 141, 147; 405/150.1, 405/151, 152, 184.2
See application file for complete search history.

(56) References Cited

U.S. PATENT DOCUMENTS

| | | | |
|---|---|---|---|
| 4,009,063 A | 2/1977 | Wood | |
| 4,671,840 A * | 6/1987 | Renaud | B29C 63/28 156/287 |
| 4,836,715 A | 6/1989 | Wood | |
| 4,976,290 A | 12/1990 | Gelin et al. | |
| 5,049,003 A | 9/1991 | Barton | |
| 5,077,107 A | 12/1991 | Kaneda et al. | |
| 5,164,237 A * | 11/1992 | Kaneda | B32B 1/08 138/125 |
| 5,168,006 A | 12/1992 | Inoguchi et al. | |
| 5,186,987 A | 2/1993 | Imoto et al. | |
| 5,218,810 A | 6/1993 | Isley, Jr. | |
| 5,271,433 A | 12/1993 | Schwert et al. | |
| D343,628 S | 1/1994 | Sciholtz | |
| 5,322,653 A | 6/1994 | Muller | |
| 5,334,429 A | 8/1994 | Imoto et al. | |
| D358,599 S | 5/1995 | Dietterich et al. | |
| 5,423,630 A | 6/1995 | Imoto et al. | |
| 5,443,880 A * | 8/1995 | Wike | A47K 10/02 2/253 |
| 5,501,248 A | 3/1996 | Kiest, Jr. | |
| 5,549,856 A | 8/1996 | Yokoshima | |
| 5,593,700 A | 1/1997 | Stilgenbauer | |
| 5,649,398 A | 7/1997 | Isley, Jr. et al. | |
| 5,683,530 A | 11/1997 | Fawley et al. | |
| 5,836,357 A | 11/1998 | Kittson | |
| 5,868,169 A | 2/1999 | Catallo | |
| 5,931,198 A | 8/1999 | Raji et al. | |
| 5,971,030 A | 10/1999 | Maimets | |
| 6,019,136 A | 2/2000 | Walsh et al. | |
| 6,027,783 A | 2/2000 | Wagener | |
| 6,042,668 A | 3/2000 | Kamiyama et al. | |
| 6,146,491 A | 11/2000 | Wood et al. | |
| 6,196,271 B1 | 3/2001 | Braun et al. | |
| 6,360,780 B1 | 3/2002 | Adolphs et al. | |
| 6,508,276 B2 | 1/2003 | Rädlinger et al. | |
| 6,615,875 B2 | 9/2003 | Adolphs et al. | |
| 6,668,596 B1 | 12/2003 | Wagener | |
| 6,708,729 B1 | 3/2004 | Smith | |
| 6,732,763 B2 | 5/2004 | Williamson et al. | |
| 6,679,966 B1 | 6/2004 | Brandenburger | |
| 7,000,645 B2 | 2/2006 | Glejbøl et al. | |
| 7,018,691 B2 | 3/2006 | McNeil | |
| 7,096,890 B2 | 8/2006 | Woolstencroft et al. | |
| 7,261,788 B1 | 8/2007 | Driver | |
| D568,347 S | 5/2008 | Manera et al. | |
| 7,478,650 B2 | 1/2009 | Pleydon et al. | |
| 7,478,659 B2 | 1/2009 | Pleydon et al. | |
| 7,708,033 B2 | 5/2010 | Tanaka et al. | |
| 7,727,447 B2 | 6/2010 | Song et al. | |
| 7,858,189 B2 | 12/2010 | Wagener et al. | |
| 7,891,381 B2 | 2/2011 | Anders et al. | |
| 7,938,146 B2 | 5/2011 | Brooks et al. | |
| D643,445 S | 8/2011 | Harrison | |
| 7,997,115 B2 | 8/2011 | Tidl et al. | |
| D646,700 S | 10/2011 | Takeuchi | |
| 8,047,238 B2 | 11/2011 | Wiessner et al. | |
| D658,689 S | 5/2012 | Li | |
| 8,375,972 B2 | 2/2013 | Kiest, Jr. | |
| 8,590,575 B2 | 11/2013 | D'Hulster | |
| D696,317 S | 12/2013 | Carper | |
| 8,616,243 B2 | 12/2013 | Kiest, Jr. | |
| D700,224 S | 2/2014 | Kmoch et al. | |
| 8,978,708 B2 | 3/2015 | Brandenburger et al. | |
| D733,198 S | 6/2015 | Chappel | |
| 9,052,053 B2 | 6/2015 | Kiest | |
| 9,222,611 B2 | 12/2015 | Colasanto | |
| 9,248,605 B2 | 2/2016 | Quitter | |
| D764,554 S | 8/2016 | Charles et al. | |
| 9,435,468 B2 | 9/2016 | Graham | |
| 9,816,660 B2 * | 11/2017 | Schwert | F16L 57/00 |
| 2002/0124898 A1 | 9/2002 | Renaud et al. | |
| 2003/0066567 A1 | 4/2003 | Manners | |
| 2003/0113489 A1 | 6/2003 | Smith | |
| 2003/0138298 A1 * | 7/2003 | Mercier | B29C 63/341 405/184.2 |
| 2003/0217777 A1 | 11/2003 | Williamson et al. | |
| 2003/0234057 A1 | 12/2003 | Woolstencroft et al. | |
| 2004/0149341 A1 | 8/2004 | Driver | |
| 2004/0258479 A1 | 12/2004 | Manners | |
| 2005/0028880 A1 | 2/2005 | Smith | |
| 2005/0028881 A1 | 2/2005 | Smith et al. | |
| 2005/0161100 A1 | 7/2005 | Pleydon et al. | |
| 2006/0118028 A1 | 6/2006 | Schroeder | |
| 2006/0124188 A1 | 6/2006 | Catha et al. | |
| 2007/0074774 A1 | 4/2007 | Chandler | |
| 2007/0172616 A1 * | 7/2007 | Ehsani | B65D 90/022 428/36.1 |
| 2007/0267785 A1 | 11/2007 | Bellamy et al. | |
| 2008/0277012 A1 | 11/2008 | Anders et al. | |
| 2008/0277013 A1 | 11/2008 | Anders et al. | |
| 2009/0116927 A1 | 5/2009 | Keenan et al. | |
| 2009/0308475 A1 | 12/2009 | Stringfellow et al. | |
| 2009/0314409 A1 | 12/2009 | Ehsani | |
| 2010/0078118 A1 | 1/2010 | Ehsani | |
| 2010/0212803 A1 | 8/2010 | Carr et al. | |
| 2012/0291903 A1 | 11/2012 | Ekelund et al. | |
| 2013/0019982 A1 | 1/2013 | Kobayashi | |
| 2013/0074972 A1 | 3/2013 | Fuechtjohann et al. | |
| 2013/0280477 A1 | 10/2013 | Davis et al. | |
| 2014/0034175 A1 | 2/2014 | Fyfe | |
| 2014/0116557 A1 | 5/2014 | Bichler | |
| 2014/0116566 A1 | 5/2014 | Bader et al. | |
| 2014/0356074 A1 | 12/2014 | Bureau et al. | |
| 2015/0045527 A1 | 2/2015 | Schleicher et al. | |
| 2015/0246501 A1 | 9/2015 | Den Besten et al. | |
| 2016/0033072 A1 | 2/2016 | Mersmann et al. | |

FOREIGN PATENT DOCUMENTS

| | | |
|---|---|---|
| DE | 19941669 A1 | 3/2001 |
| EP | 0510784 A1 | 10/1992 |
| EP | 2390547 A2 | 11/2001 |
| EP | 2273171 A1 | 1/2011 |
| EP | 2722157 A1 | 4/2014 |
| JP | H02219635 | 9/1990 |
| JP | H0350280 A | 3/1991 |

(56) References Cited

FOREIGN PATENT DOCUMENTS

| JP | H03292127 A | 12/1991 |
| JP | S5262379 | 5/1997 |
| JP | 2007518608 A | 7/2007 |
| KR | 20060012367 A | 2/2006 |
| WO | 2012145422 A1 | 10/2012 |
| WO | 2013163736 A1 | 5/2013 |
| WO | 2014110544 A1 | 7/2014 |

OTHER PUBLICATIONS

Trenchless Technology, Trenchless Lateral Repair Keeps Oregon Landscape Untouched, Apr. 2012, 2 pages.
VECTORPLY(R) Performance Composite Reinforcements, product sheet E-LTM 3610, VECTORPLY(R) Corporation, Rev. May 3, 2011.
VECTORPLY(R) Performance Composite Reinforcements, product sheet E-BX 1200, VECTORPLY(R) Corporation, Rev. May 3, 2011.
VECTORPLY(R) Performance Composite Reinforcements, product sheet E-TLX 2400, VECTORSPORTS(TM), VECTORPLY(R) Corporation, Rev. May 3, 2011.
VECTORPLY(R) Performance Composite Reinforcements, product sheet E-QX 4800, LABORSAVER(TM), VECTORPLY(R) Corporation, Rev. May 3, 2011.
VECTORPLY(R) Performance Composite Reinforcements, product sheet E-LM 3610, LABORSAVER(TM), VECTORPLY(R) Corporation, Rev. May 3, 2011.
VECTORPLY(R) Performance Composite Reinforcements, product sheet E-TLX 2200, VECTORSPORTS(TM), VECTORPLY(R) Corporation, Rev. May 3, 2011.
VECTORPLY(R) Performance Composite Reinforcements, product sheet E-BXM 1708, VECTORPLY(R) Corporation, Rev. May 3, 2011.
VECTORPLY(R) Performance Composite Reinforcements, product sheet E-BX 1700, VECTORPLY(R) Corporation, Rev. May 3, 2011.
VECTORPLY(R) Performance Composite Reinforcements, product sheet E-QXCFM 3510, VECTORFUSION(TM) Infusion Specific Reinforcements, VECTORPLY(R) Corporation, Rev. May 3, 2011.
VECTORPLY(R) Performance Composite Reinforcements, product sheet E-BXCFM 1710, VECTORFUSION(TM), Infusion-Specific Reinforcements, VECTORPLY(R) Corporation, Rev. May 3, 2011.
Rongxing Zhou, An Improved MWK Structure for Composite Reinforcement, Textile Research Journal, Published by Sage, Apr. 1, 2005.
FYFE(R) an Aegion Company, Tyfo(R) Fibrwrap(R) Composite Systems, 3 pages, Copyright 2013 Fyfe Co., LLC (admitted prior art).
Pipelines 2014: From Underground to the Forefront of Innovation and Sustainability; Fifteen Years of Lessons Learned . . . ; (C) ASCE 2014, 14 pages.
Fyfe Co. LLC, Tyfo(R) WEB Composite using Tyfo(R) S Epoxy, 2 pages, Copyright 2005-2012 Fyfe Co. LLC 23-12.
Search Report of related application No. PCT/IB2015/055334, 6 pages dated Oct. 19, 2015.
Written Opinion of related application No. PCT/IB2015/055334, 8 pages dated Oct. 19, 2015.
Tube Forming System consisting of four photographs and description, admitted as prior art, 5 pages.

* cited by examiner

PRIOR ART

HIGH-STRENGTH, WATERTIGHT PIPE LINING

CROSS REFERENCE TO RELATED APPLICATIONS

The present application claims priority to U.S. Provisional Patent Application Ser. No. 62/024,240, entitled HIGH-STRENGTH, WATERTIGHT PIPE LINING, which is hereby incorporated by reference into the present disclosure.

FIELD

The present disclosure relates generally to the repair of pipes and more particularly to methods and systems for pipe repair by lining of the pipe.

BACKGROUND

Over time or because of a particular event or condition (e.g., seismic activity, exposure to excessive or uneven loads or moments, exposure to micro-organisms, poor compaction, crown corrosion, corrosive soil, etc.), the structural integrity or capacity of force mains, other pipes and other structures may diminish. For example, such items may crack, corrode, deteriorate and the like. Different methods of repairing or otherwise strengthening damaged pipes and other items are well-known. For example, liners or layers made of fiber reinforced polymers can be attached to one or more portions of a pipe interior. Among other ways, liners of this type can be formed in a tubular shape and dragged in or everted into the pipe to be repaired. Still further, in larger diameter pipes, the lining may be formed by manually adhering sheets of repair material to the walls of the pipe.

Certain high-strength liners or sheets are made of woven fibers of glass, carbon, aramid, or the like impregnated with a polymeric matrix that is, in some embodiments, cured in place. The woven fibrous material typically has a relatively open or loose weave that is water permeable in the absence of the polymeric material. Though the polymeric material in most instances prevents groundwater from infiltrating a pipe for a time, pinhole leaks are known to form in the openings between the woven fibrous strands under certain conditions. Pinhole leaks let undesirable groundwater enter the pipe. Moreover, high strength liners are often used to line pipes that carry pressurized fluids. Pressurized fluid can easily escape through pinhole leaks and cause further damage to the liner.

SUMMARY

In one aspect, a method of reinforcing a pipe having a pipe wall comprises impregnating a water penetration resistant layer of fiber laden fabric comprising fibers woven in a weave that is resistant to water penetration and a strengthening layer of fiber laden material comprising strengthening fibers. The water penetration resistant layer and the strengthening layer are positioned in relation to the pipe to substantially cover one of an inner surface and an outer surface of at least a portion of the pipe wall. The curable polymer in the water penetration resistant layer and the strengthening layer is cured while the water penetration resistant layer and strengthening layer are positioned in relation to the pipe substantially covering one of the inner and outer surfaces of the portion of the pipe wall to form a strengthening liner of fiber reinforced polymer and a water penetration resistant liner adjacent said portion of the pipe wall. The strengthening liner and the water penetration resistant liner are configured in combination to enhance the strength of said portion of the pipe wall and to provide a water tight barrier along said portion of the pipe wall.

In another aspect, a waterproofed and reinforced pipe comprises a host pipe having a pipe wall. A strengthening liner extends along a portion of the pipe wall in a first position. The strengthening liner comprises fiber reinforced polymer and includes strengthening fibers arranged in a polymer matrix to provide structural reinforcement of said portion of the pipe wall. A water penetration resistant liner extends along said portion of the pipe wall in a second position. The water penetration resistant liner comprises fiber reinforced polymer and includes a water penetration resistant layer of fiber laden fabric comprising fibers woven in a weave that is resistant to water penetration. The water penetration resistant liner provides a watertight barrier between an exterior of the pipe adjacent said portion of the pipe wall and an interior of the pipe opposite said portion of the pipe wall from said exterior.

In another aspect, a method of waterproofing a reinforced pipe comprising a pipe and a preexisting reinforcing inner liner comprising a fiber reinforced polymer and having an inner surface bounding an interior of the reinforced pipe comprises impregnating a water penetration resistant layer of fiber laden fabric comprising fibers woven in a weave that is resistant to water penetration with a curable polymer. The water penetration resistant layer is positioned in contact with the inner surface of the preexisting reinforcing liner to substantially cover said inner surface. The curable polymer in the water penetration resistant layer is cured while the water penetration resistant layer covers the inner surface to form a new water penetration resistant liner over the inner surface of the preexisting strengthening liner. The new water penetration resistant liner provides a watertight barrier between the interior of the reinforced pipe and an exterior of the reinforced pipe opposite the interior.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION

Figure 1:
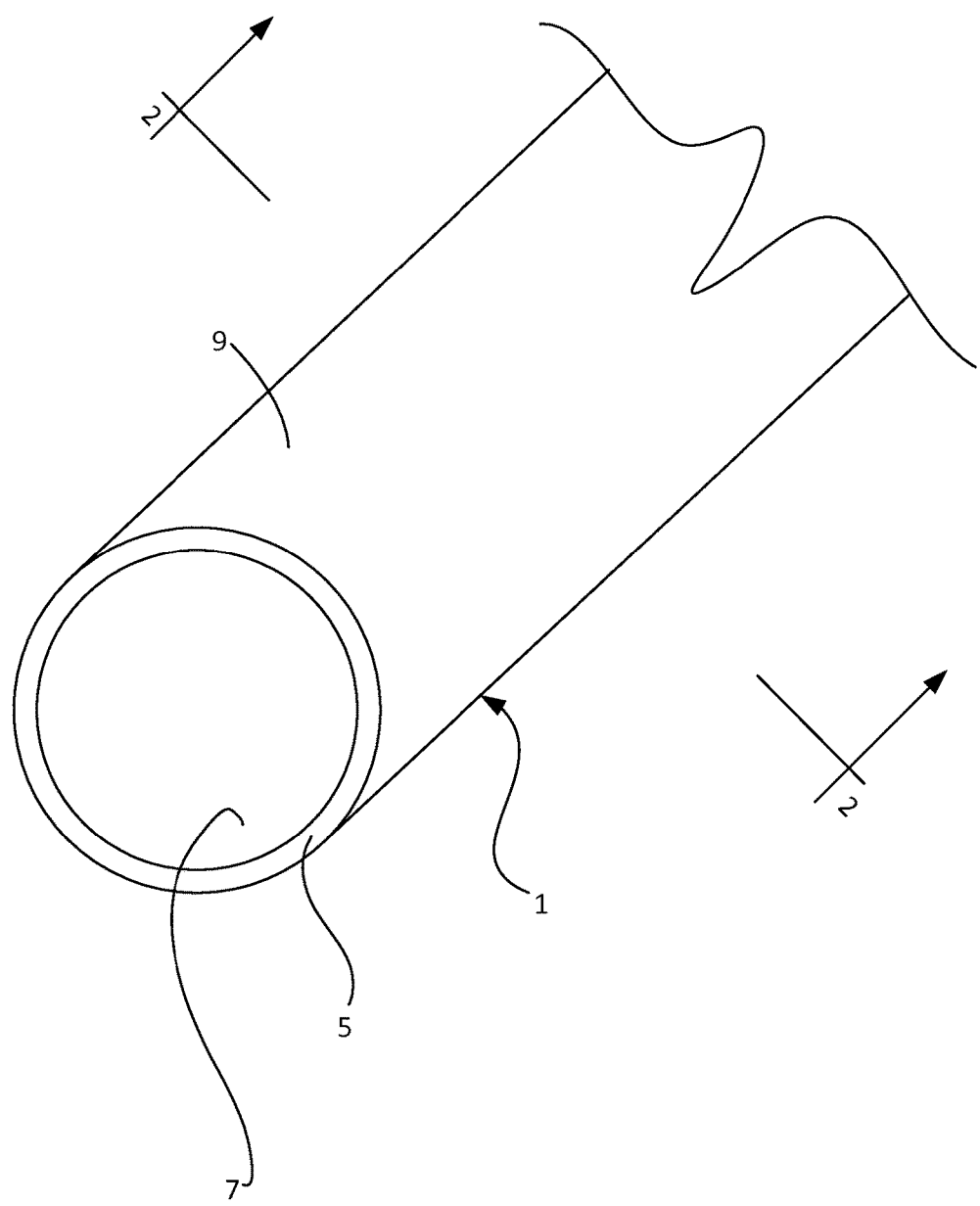
FIG. 1 is a fragmentary perspective of a pipe having an opening in a side wall thereof.

Referring now to the drawings, a pipe 1 in need of repair shown schematically in FIG. 1 has structural damage. Although not illustrated, the pipe 1 is located underground where groundwater may pass into the pipe 1 as a result of the damage. Moreover, in one or more embodiments, the pipe 1 is a high pressure pipe which carries pressurized fluid that may leak out of a break in the pipe. In some cases, the damage to the pipe 1 can be large openings, small openings, hairline fractures, or other breakage. The damage can be no more than a crack or pinhole that extends through the side wall 5 of the pipe allowing groundwater to pass into the interior of the pipe or pressurized fluid to pass out of the pipe. In some cases, the pipe structure can merely be weakened and in need of reinforcement though the pipe 1 is still impervious to groundwater or leakage of pressurized fluid inside the pipe. The weakened structure can present an unacceptable risk of future leakage or further breakage that renders the pipe in need of reinforcement or repair.

Figure 2:
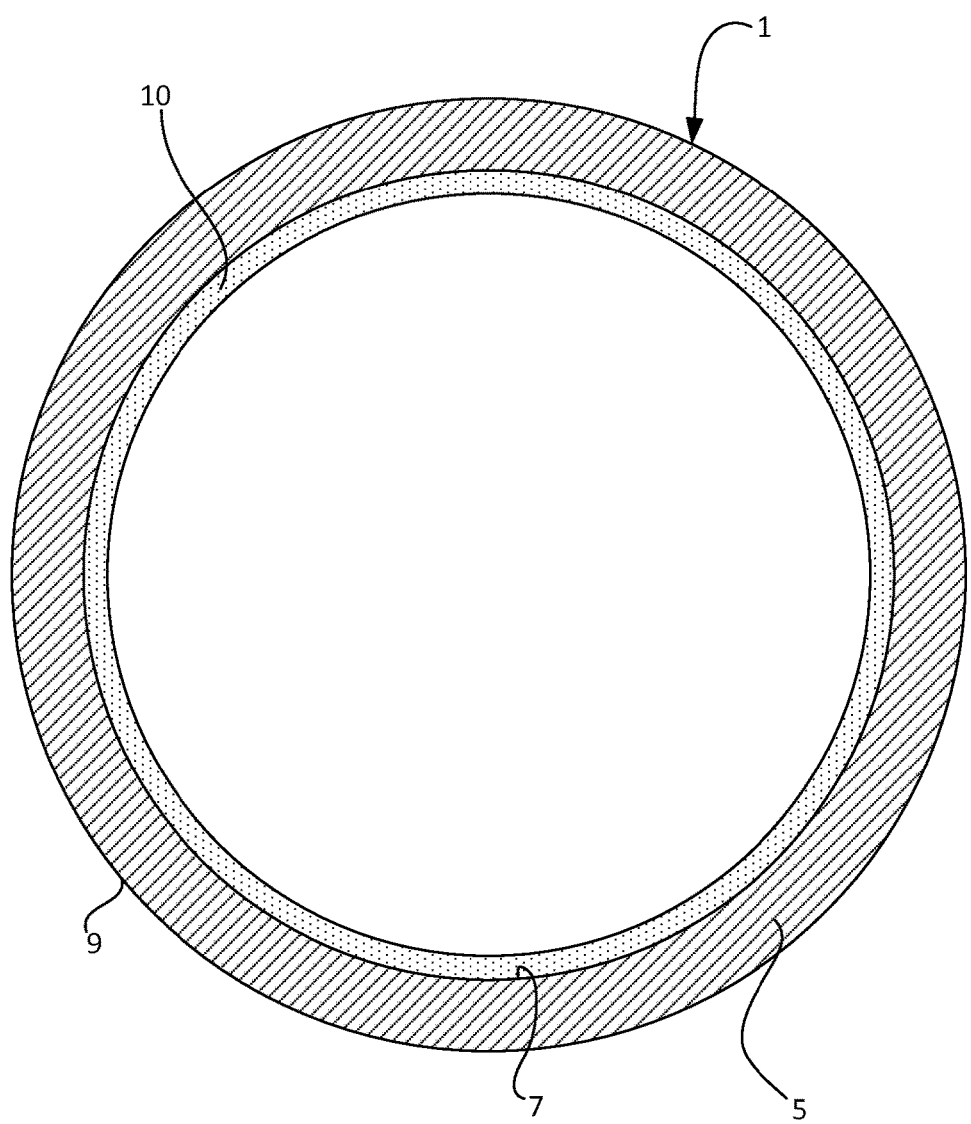
FIG. 2 is an enlarged section taken in the plane 2-2 of FIG. 1 and schematically illustrating reinforcement of the pipe according to prior art principles.

One technique for reinforcing a compromised structure of a pipe is described in U.S. Pat. No. 5,931,198, which is assigned to the assignee of the present invention and is hereby, for all purposes, incorporated by reference. U.S. Pat. No. 5,931,198 describes a system and method for reinforcing the structure of a compromised large diameter pipe (e.g., a pipe having a lumen of sufficiently large cross-sectional area to allow a technician to enter the pipe to perform repairs) with a fibrous liner. An installation technician prepares an inner surface 7 of a wall 5 of a large-diameter pipe 1 by cleaning, abrading, and/or drying the surface and applies a tack coat of contact cement or the like to the inner surface. As shown in FIG. 2, a first liner 10 is then formed along the pipe wall 5 in contact with the inner surface 7 of the pipe 1. In particular, a reinforcement material formed by saturating fibrous fabric with a curable polymer (e.g., a resin, or more particularly TYFO® WP Epoxy) is applied to the inner surface 7 of the pipe 1, where it temporarily adheres due to the tack coat, and is cured in place. The system and method described in U.S. Pat. No. 5,931,198 produces a structurally reinforced pipe 1 (FIG. 2) that is structurally reinforced to a certain degree.

U.S. Patent Application Publication No. 2014/6034175 and International Patent Application No. PCT/US2014/011397, which are each assigned to the assignee of the present invention and are hereby, for all purposes, incorporated by reference, describe other methods and systems for reinforcing a pipe in need of repair that are suitable for a smaller diameter pipe (e.g., a pipe having a lumen whose cross-sectional area would not permit a technician to enter the pipe to perform repairs). In the systems and methods described in U.S. Patent Application Publication No. 2014/6034175 and International Patent Application No. PCT/US2014/011397, an expandable tube carries one or more layers of a reinforcement material impregnated with a curable polymer. In combination, the expandable tube, reinforcement material, and curable polymer are threaded through a pipe 1 in need of repair. The expandable tube is expanded so the reinforcement material and curable polymer contact the inner surface 7 of the pipe wall 5, and the curable polymer is cured. This forms a composite first liner 10 made of a cured polymer reinforced by the reinforcement material. As above, the reinforcement material is woven fibers of glass, carbon, aramid, or the like. The systems and methods described in U.S. Patent Application Publication No. 2014/6034175 and International Patent Application No. PCT/US2014/011397 create a reinforced pipe that is similar in relevant respects to the reinforced pipes created by the systems and methods described in U.S. Pat. No. 5,931,198.

Figure 3:
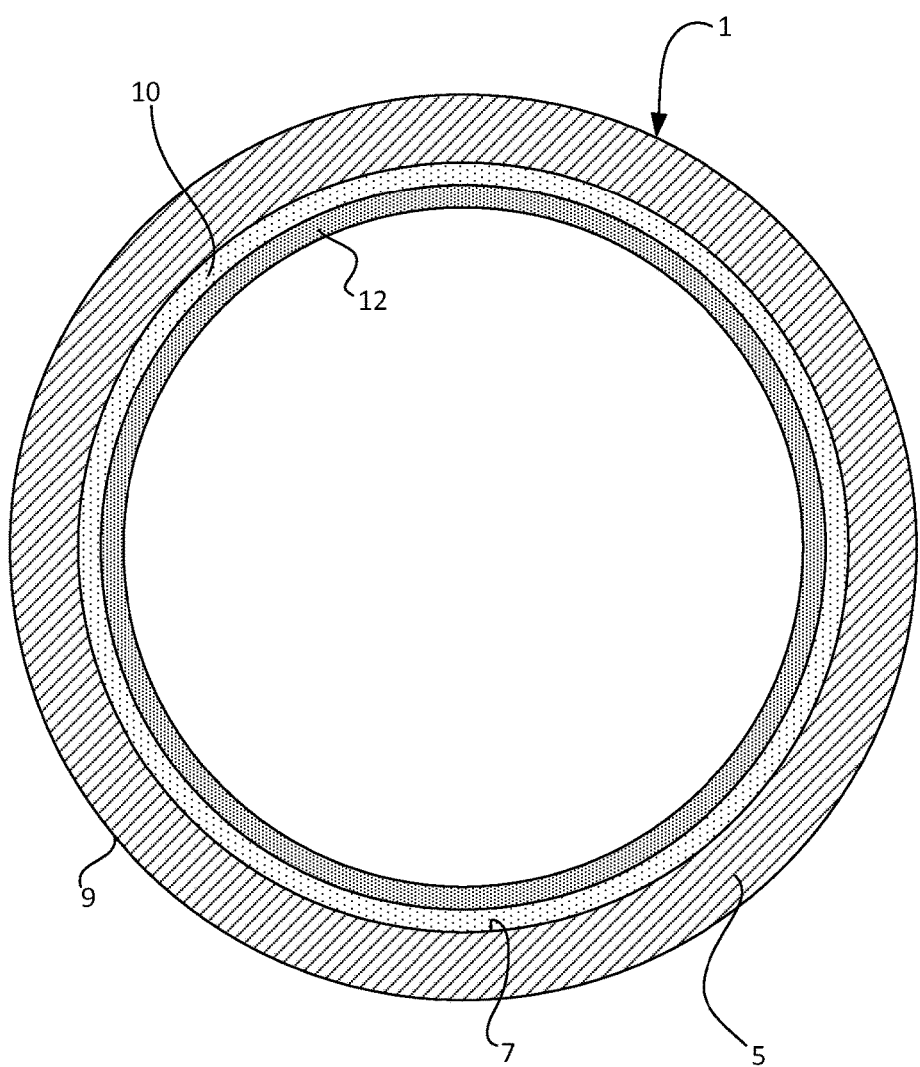
FIG. 3 is an enlarged section similar to FIG. 2 schematically illustrating an embodiment of reinforcement of the pipe according to the principles of the present invention.

Referring to FIG. 3, in one embodiment of a method of reinforcing a pipe in need of repair according to the present invention, the inner surface 7 of the wall 5 of the pipe 1 is first prepared. The inner surface 7 of the wall can be prepared, for example, by cleaning, abrading, priming, and/or drying the surface. In addition, if the surface 7 has surface voids, they can be filled with an epoxy or other filler. If the wall 5 of the pipe 1 has breaches, they can be at least temporarily blocked to prevent groundwater from infiltrating the pipe during later steps of the method. Generally, no pressurized fluid will be present in the pipe during pipe lining.

After the pipe is prepared, a first liner 10 and a second liner 12 are each formed to extend along the pipe wall. The second liner 12 is made of woven fibers that have a weave that is resistant to water penetration, and the first liner 10 is formed with strengthening fibers configured in a more open weave than the second liner. In preferred embodiments, once formed, both the first and second liners 10, 12 have a pipe shape, such that each extends continuously in the hoop direction along a length of the pipe 1. As a result, each liner provides structural support for the pipe 1 for its complete hoop. Suitable techniques such as described in U.S. Pat. No. 5,931,198, U.S. Patent Application Publication No. 2014/6034175, or International Patent Application No. PCT/US2014/011397 can be adapted for use in forming and/or placing the first liner 10 and the second liner 12 in or on the pipe 1.

Figure 4:
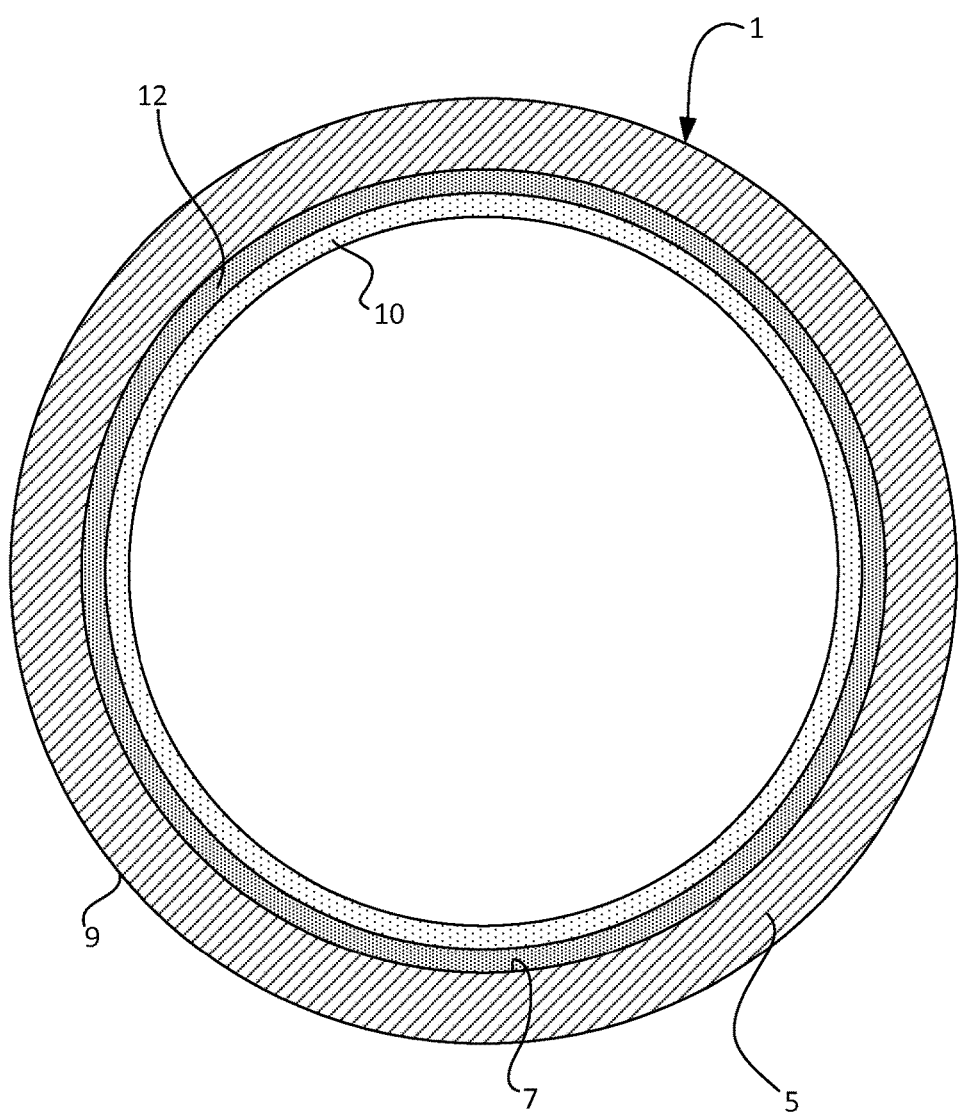
FIG. 4 is an enlarged section similar to FIG. 2 schematically illustrating another embodiment of reinforcement of the pipe according to the principles of the present invention.

As shown in FIGS. 3 and 4, either of the first liner 10 and the second liner 12 can be installed in the pipe 1 in need of repair first. Thus, the first liner 10 can be formed in the pipe 1 such that an outer surface of the first liner 10 contacts (e.g., is adhered to) the inner surface 7 of the pipe wall 5. Alternately, the second liner 12 can be formed in the pipe 1 such that an outer surface of the second liner 12 contacts the inner surface 7 of the pipe wall 5. If the outer surface of the first liner 10 contacts the inner surface 7 of the pipe wall 5, the second liner 12 is formed in the pipe 1 such that an outer surface of the second liner 12 contacts the inner surface of the first liner 10 (FIG. 3). If the outer surface of the second liner 12 contacts the inner surface 7 of the pipe wall 5, the first liner 10 is formed in the pipe 1 such that an outer surface of the first liner 10 contacts the inner surface of the second liner 12 (FIG. 4).

In the embodiments of FIGS. 3 and 4, the first and second liners 10, 12 form a composite liner. In certain embodiments, the first liner 10 is made of woven fibers of carbon that are electrically conductive. In that case, the second liner 12 is preferably made of a dielectric material, such as glass fibers.

Figure 5:
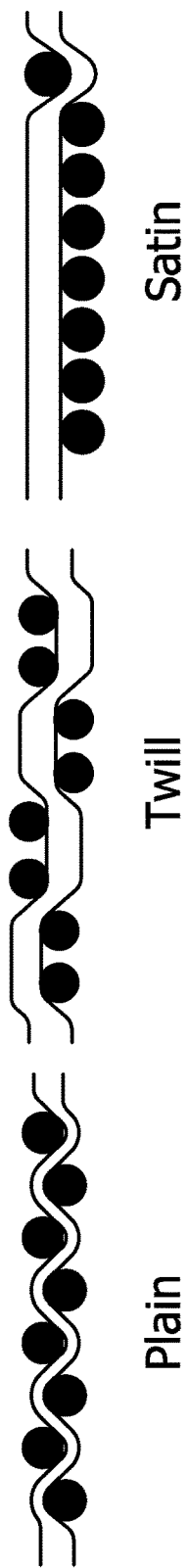
FIG. 5 is a three section view of woven fibers illustrating a plain weave, a twill weave, and a satin weave.

In a preferred embodiment, the second liner 12 is made of woven glass fibers. However, other fibers can also be used for the second liner 12, such as carbon, aramid, etc., without departing from the scope of the invention. In some embodiments the second liner has a satin weave, one example of which is illustrated in FIG. 5. In other embodiments the second liner 12 has a twill weave. In a suitable embodiment, the weave is one in which the weft floats or skips over as many as 12 warps before being woven into the weave. The next pick repeats the float, but on a different set of warps.

Generally, the material will be at least minimally conformable to the surface to which it is applied. However, "conformable" includes semi-rigid materials. For example, in one preferred embodiment, the second liner is Tyfo® Web, which is a custom 0°/90° bi-directional weave glass fabric sold by the assignee of the present application.

The steps of forming the liners 10 and 12 can include saturating woven fibers with curable polymer. In a preferred embodiment, the woven fibers are impregnated prior to being placed adjacent the wall 5 of the pipe 1 at the location at which they are to be cured. However, the woven fibers of each of either or both of the liners 10 and 12 could also be placed into the desired position before being impregnated with a curable polymer without departing from the scope of the invention. One example of a suitable curable polymer is an epoxy. One such epoxy is Tyfo® S epoxy available from Fyfe Co. LLC of San Diego, Calif. It will be appreciated by those of ordinary skill in the art that different materials can also be used without departing from the scope of the invention.

In one embodiment of a method of reinforcing the pipe 1, a tack coat is applied to the inner surface 7 of the pipe 1. One of the first liner 10 and the second liner 12 is impregnated with a curable polymer, applied to the tack coat on the inner surface 7, and allowed to cure. As one alternative, the first or second liner 10, 12 may be applied dry to the tack coat and then impregnated with the curable polymer. Another tack coat is applied to the inner surface of the cured liner, and the other of the first liner 10 and the second liner 12 is applied to the coated inner surface of the cured liner. The other of the first liner 10 and the second liner 12 is allowed to cure. It is to be understood that the other tack coat may not be applied. In that case the epoxy in the liner (10 or 12) applied to the pipe wall would be used to adhere the other liner. Either or both of the first and second liners 10, 12 may be formed within the pipe. In other words, the liners 10, 12 need not be pre-formed as tubes, but may be formed within the pipe by adhering (rectangular) sheets of material to the pipe wall or to the previously applied liner material.

In another embodiment of a method of reinforcing the pipe 1, to form the second liner 12, a suitable fiber weave of the second liner is secured to a carrying tube. The weave of the second liner 12 can subsequently be impregnated with a curable polymer, or, alternatively, can be secured to the carrying tube pre-impregnated. The second liner 12 and the carrying tube are delivered to a location inside the pipe 1. Once at the location inside the pipe 1, the carrier tube is radially expanded such that the second liner 12 contacts an inner surface of one of the pipe and the first liner 10. After the second liner 12 has been expanded, it is allowed to cure. It will be understood that some combination of the aforementioned methods or other ways could be used to place the first and second liners 10, 12 in the pipe 1.

The curable polymer used in the first and second liners 10 and 12 can be allowed to cure in ambient conditions or more rapidly cured using heat, UV, or other curing stimulant. As cured, the epoxy and fabric of the liners 10, 12 provide strong and liquid tight reinforcement of the pipe 1.

Figure 6:
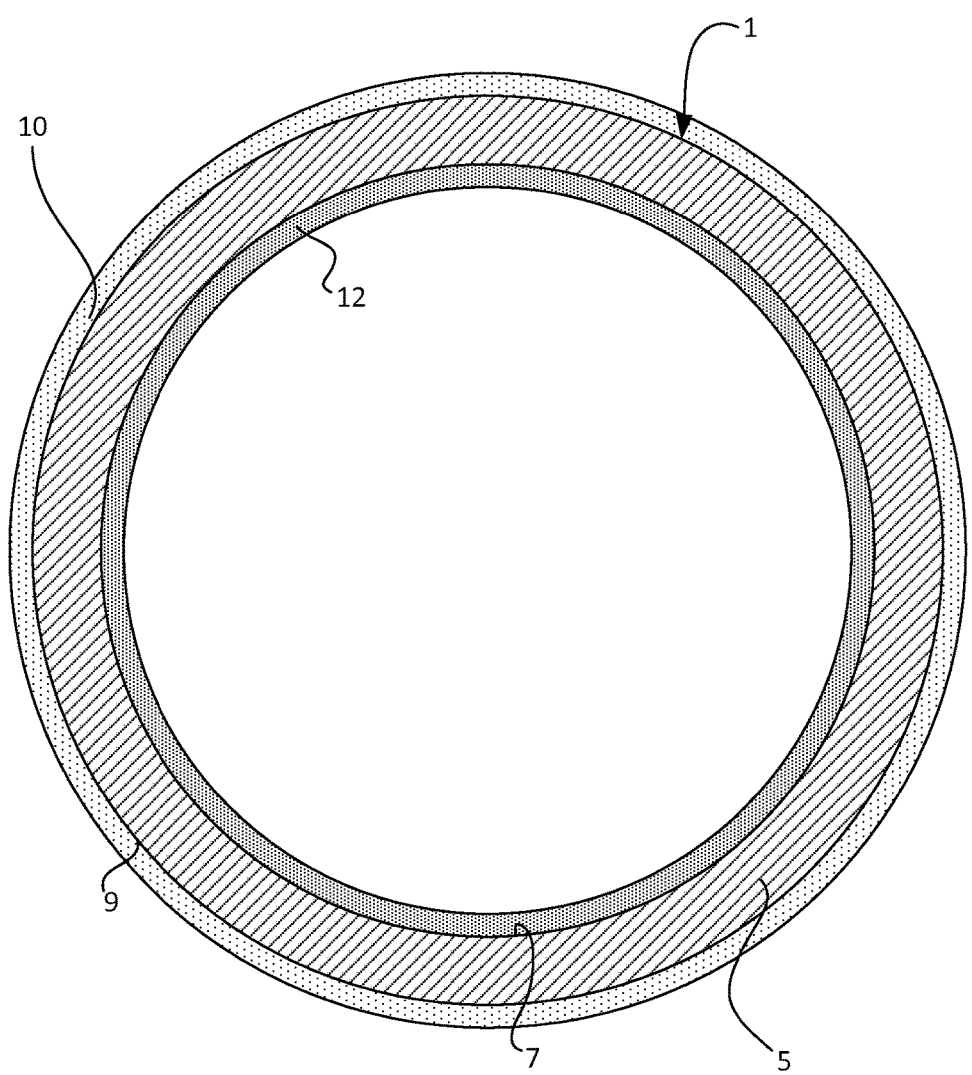
FIG. 6 is an enlarged section similar to FIG. 2 schematically illustrating another embodiment of reinforcement of the pipe according to the principles of the present invention.
Figure 7:
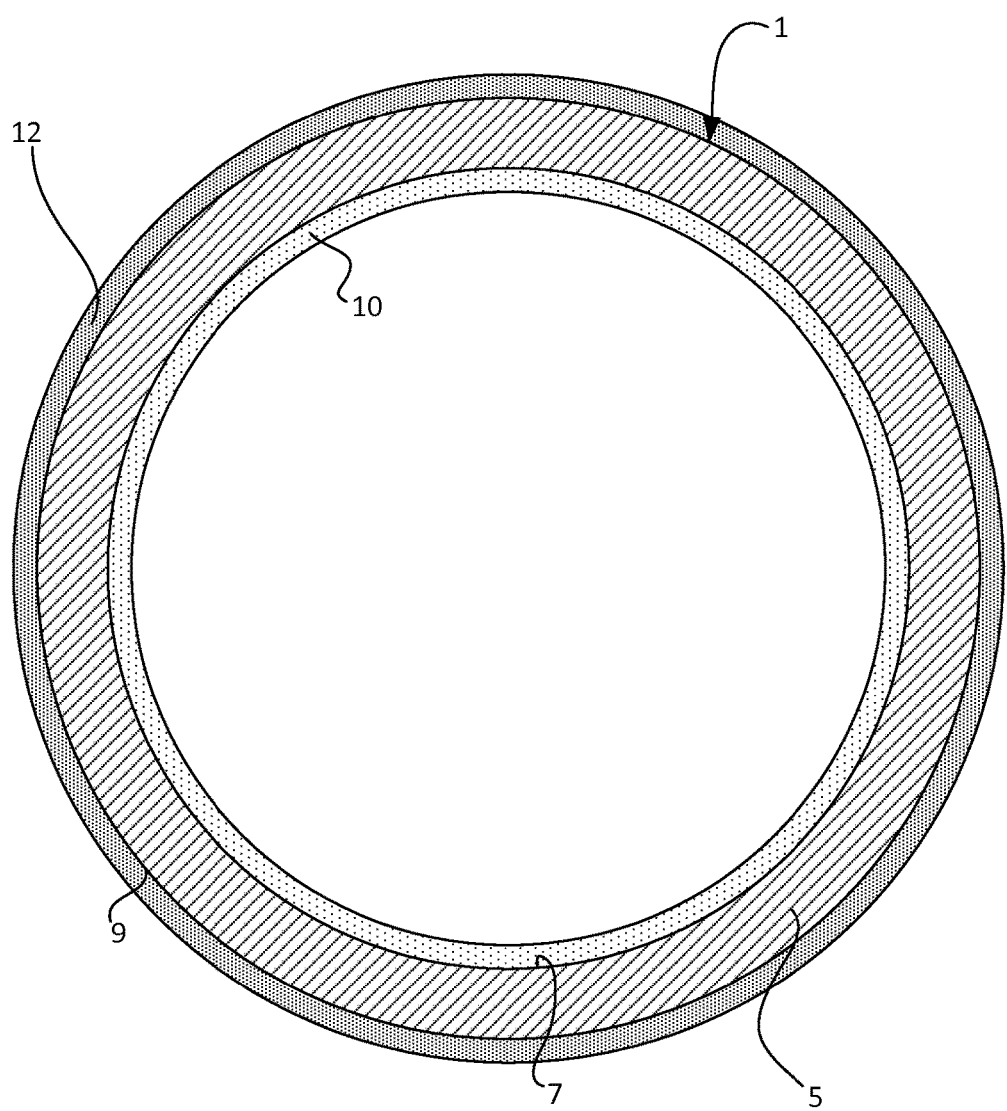
FIG. 7 is an enlarged section similar to FIG. 2 schematically illustrating another embodiment of reinforcement of the pipe according to the principles of the present invention.
Figure 8:
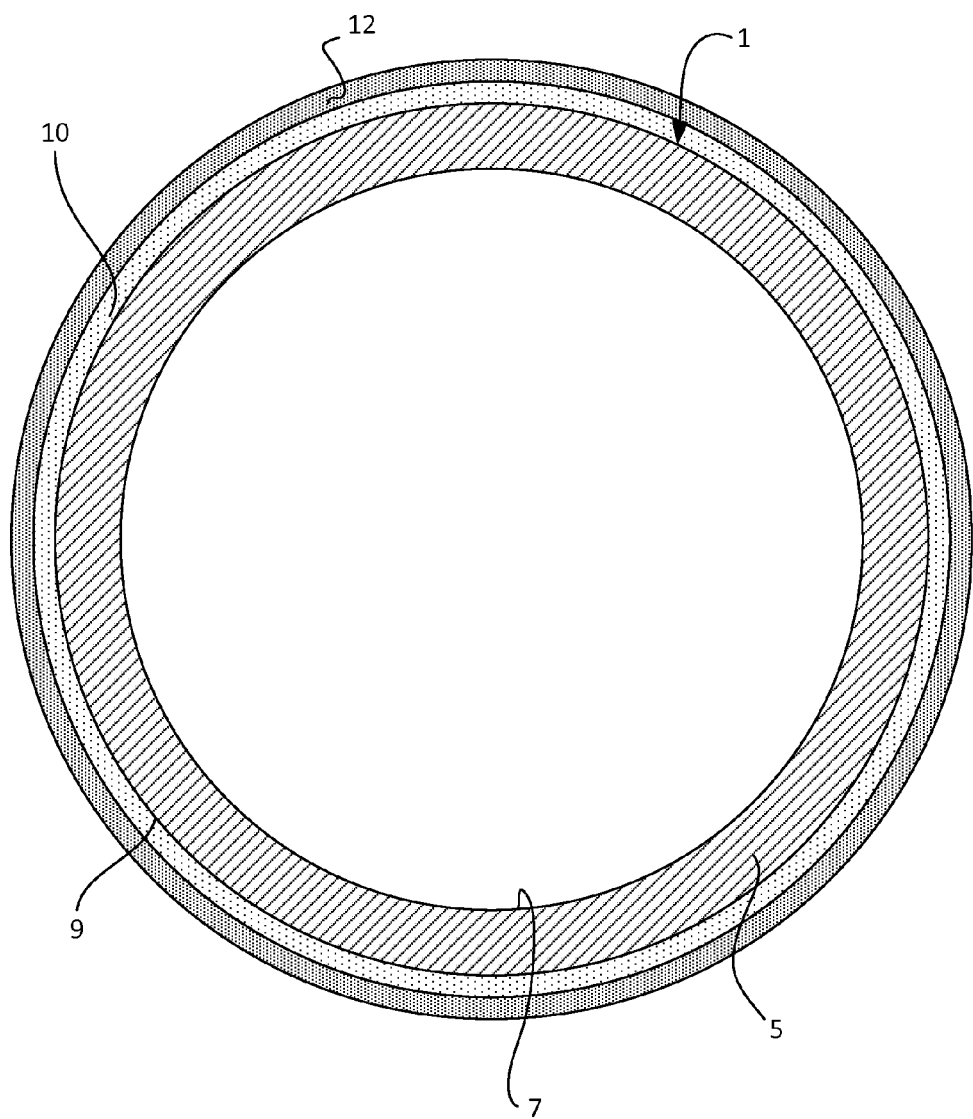
FIG. 8 is an enlarged section similar to FIG. 2 schematically illustrating another embodiment of reinforcement of the pipe according to the principles of the present invention.
Figure 9:
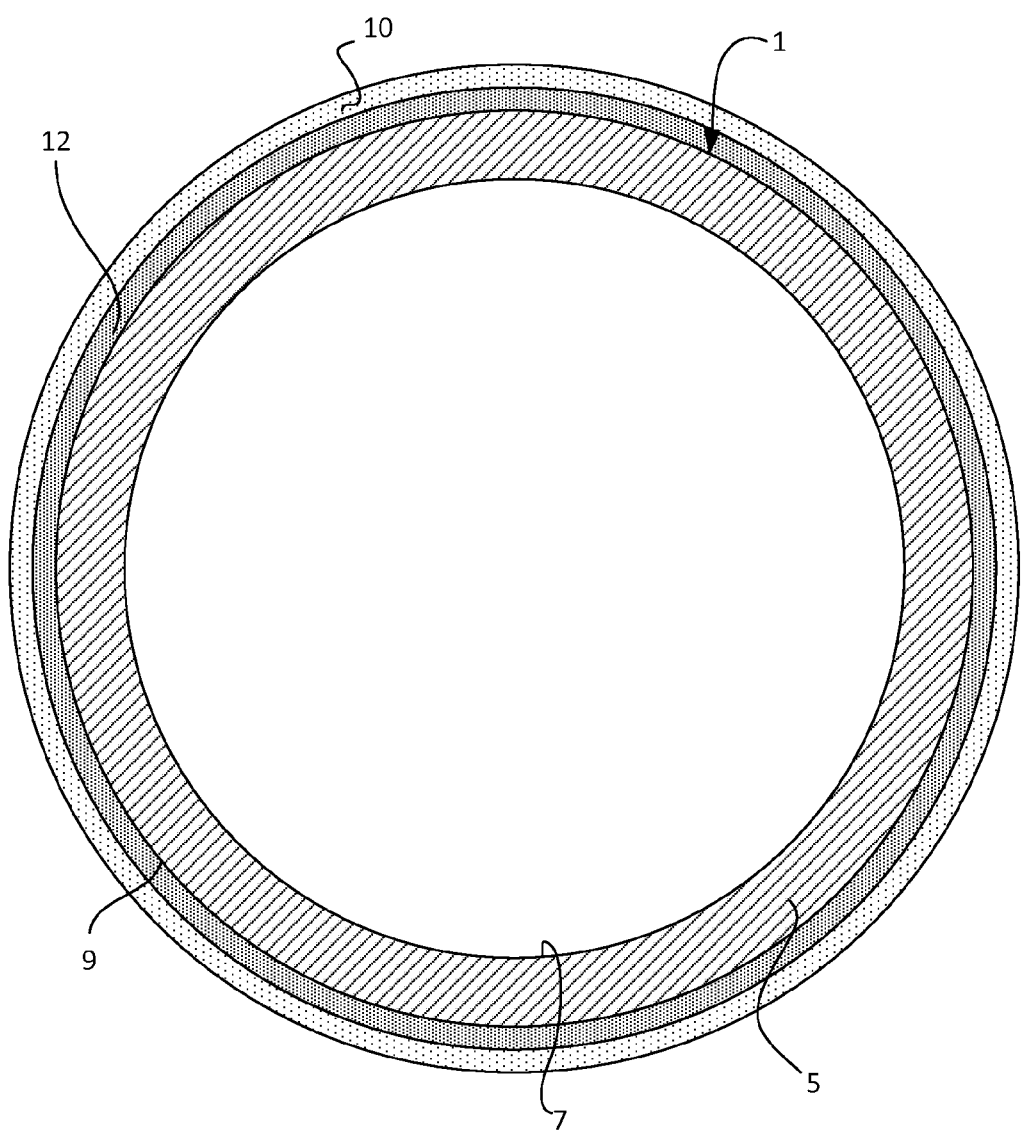
FIG. 9 is an enlarged section similar to FIG. 2 schematically illustrating another embodiment of reinforcement of the pipe according to the principles of the present invention.

Referring to FIGS. 6 and 7, in other embodiments of a method of reinforcing the pipe 1, one of the first liner 10 and the second liner 12 is formed on an outer surface 9 of the pipe. Referring to FIGS. 8 and 9, in still other embodiments of a method of reinforcing the pipe 1, both of the first liner 10 and the second liner 12 are formed on an outer surface 9 of the pipe. In these embodiments, the outer surface 9 of the pipe 1 can be prepared as described above with respect to the inner surface 7. Moreover, as above, when both the first liner 10 and the second liner 12 are formed on the outer surface 9 of the pipe 1, either of the liners can be formed first without departing from the scope of the invention. Thus, as shown in FIG. 8, the first liner 10 can be formed to contact (e.g., adhere to) the outer surface 9 of the pipe 1, and the second liner 12 can be formed to contact the outer surface of the first liner. Alternatively, as shown in FIG. 9, the second liner 12 can be formed to contact (e.g., adhere to) the outer surface 9 of the pipe 1, and the first liner 10 can be formed to contact the outer surface of the second liner.

In one embodiment, the present invention includes a method of waterproofing a reinforced pipe such as the one illustrated in FIG. 2. This method is particularly well-suited for when a pipe 1 that has been reinforced with a fiber-reinforced polymer liner 10 that has developed pinhole leaks at one or more polymer-filled spaces of the fiber weave. The reinforced pipe of FIG. 2 includes a pipe 1 and a reinforcing inner liner 10 (e.g., the first liner) made of fiber reinforced polymer. The method of waterproofing includes a step of adhering a waterproofing layer 12 (e.g., the second liner) to the inner surface of the reinforcing inner liner 10 (FIG. 3). The waterproofing layer 12 preferably is made of woven fibers in a polymer matrix having a satin weave. However, the waterproofing layer 12 can also have other weaves that are more impermeable than the reinforcing inner liner 10. The waterproofing layer 12 can be adhered to the inner surface of the reinforcing inner liner using any of the techniques discussed above (e.g., tacking and curing in place or expanding a carrier tube and curing in place). In one or more embodiments, the waterproofing layer 12 provides a watertight barrier that is watertight up to an internal fluid pressure of at least about 600 pounds per square inch gauge pressure (about 4.14 MPa).

The methods of reinforcing a pipe described above can be practiced to create the reinforced pipes illustrated in FIG. 3, 4, 6, 7, 8, or 9. Thus, in certain embodiments of the present invention comprises a reinforced pipe constructed in accordance with the principles set forth in the methods discussed above.

The systems, apparatuses, devices and/or other articles disclosed herein may be formed through any suitable means. The various methods and techniques described above provide a number of ways to carry out the inventions. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the invention.

Although the inventions have been disclosed in the context of certain embodiments and examples, it will be understood by those skilled in the art that the inventions extend beyond the specifically disclosed embodiments to other alternative embodiments and/or uses and obvious modifications and equivalents thereof. Accordingly, it is not intended that the inventions be limited, except as by the appended claims.

What is claimed is:

1. A method of reinforcing a pipe having a pipe wall comprising:
   impregnating with a curable polymer a water penetration resistant layer of fiber laden fabric comprising fibers woven in a weave that is resistant to water penetration and a strengthening layer of fiber laden material comprising strengthening fibers;
   positioning the water penetration resistant layer and the strengthening layer in relation to the pipe to substantially cover one of an inner surface and an outer surface of at least a portion of the pipe wall; and
   curing the curable polymer in the water penetration resistant layer and the strengthening layer while the water penetration resistant layer and strengthening layer are positioned in relation to the pipe substantially covering one of the inner and outer surfaces of said portion of the pipe wall to form a strengthening liner of fiber reinforced polymer and a water penetration resistant liner adjacent said portion of the pipe wall, wherein the strengthening liner and the water penetration resistant liner are configured in combination to enhance the strength of said portion of the pipe wall and to provide a water tight barrier along said portion of the pipe wall;
   wherein after curing the curable polymer, the pipe is free of impermeable film that extends along said portion of the pipe wall to provide a fluid barrier and free of impermeable foil that extends along said portion of the pipe wall to provide a fluid barrier.

2. The method of claim 1 wherein the steps of impregnating the water penetration resistant layer and the strengthening layer are carried out simultaneously.

3. The method of claim 2 further comprising providing a composite liner including the water penetration resistant layer and the strengthening layer.

4. The method of claim 3 further comprising forming the composite liner into a pipe shape before positioning the composite liner in relation to the pipe to substantially cover one of the inner surface and the outer surface of said portion of the pipe wall.

5. The method of claim 4 wherein positioning the composite liner comprises expanding the pipe-shaped composite liner within the pipe to bring the water penetration layer into contact with the inner surface of said portion of the pipe wall.

6. The method of claim 5 positioning the composite pipe-shaped liner further includes securing the composite pipe-shaped liner to a carrier tube and delivering the carrier tube through the pipe to a position adjacent said portion of the pipe wall and expanding the carrier tube.

7. The method of claim 1 wherein the fibers in the water penetration resistant layer are woven in one of a satin weave and a twill weave.

8. The method of claim 1 wherein the fibers of the water penetration resistant layer comprise glass fibers.

9. The method of claim 1 further comprising applying a tack coat to one of said inner and outer surfaces of the pipe wall and applying one of the water penetration resistant layer and the strengthening layer to the tack coat.

10. The method of claim 9 further comprising applying another tack coat to said one of said layers and applying the other of said layers to said other tack coat.

11. The method of claim 1 further comprising cleaning and drying one of the inner and outer surfaces of the pipe wall.

12. The method of claim 1 further comprising filling irregularities in at least one of the inner and outer surfaces of the pipe wall with a tack coat.

13. The method of claim 1 wherein positioning the water penetration resistant layer and the strengthening layer comprises separately positioning the water penetration resistant layer and the strengthening layer.

14. A waterproofed and reinforced pipe comprising:
   a host pipe having a pipe wall;
   a strengthening liner extending along a portion of the pipe wall in a first position, the strengthening liner comprising fiber reinforced polymer and including strengthening fibers arranged in a polymer matrix to provide structural reinforcement of said portion of the pipe wall; and
   a water penetration resistant liner extending along said portion of the pipe wall in a second position, the water penetration resistant liner comprising a water penetration resistant layer of fiber laden fabric comprising fibers woven in a weave that is resistant to water penetration and cured polymer impregnating the water penetration resistant layer, the water penetration resistant liner providing a watertight barrier between an exterior of the pipe adjacent said portion of the pipe wall and an interior of the pipe opposite said portion of the pipe wall from said exterior;
   wherein the waterproofed and reinforced pipe is free of impermeable film that extends along said portion of the pipe wall to provide a fluid barrier and the waterproofed and reinforced pipe is free of impermeable foil that extends along said portion of the pipe wall to provide a fluid barrier.

15. The pipe of claim 14 wherein the fibers of the water penetration resistant liner are woven in one of a satin weave and a twill weave.

16. The pipe of claim 14 wherein the water penetration resistant liner and the strengthening liner form a multilayer composite liner.

17. The pipe of claim 16 wherein the fibers of the water penetration resistant layer comprise a dielectric material.

18. The pipe of claim 14 wherein the fibers in the water penetration resistant liner comprise glass fibers and the fibers in the strengthening liner comprise carbon fibers.

19. The pipe of claim 14 wherein the water penetration resistant liner is positioned between the strengthening liner and the pipe wall.

20. A method of waterproofing a reinforced pipe comprising a pipe and a preexisting reinforcing inner liner comprising a fiber reinforced polymer and having an inner surface bounding an interior of the reinforced pipe, the method comprising:
   impregnating a water penetration resistant layer of fiber laden fabric comprising fibers woven in a weave that is resistant to water penetration with a curable polymer;
   positioning the water penetration resistant layer in contact with the inner surface of the preexisting reinforcing liner to substantially cover said inner surface; and
   curing the curable polymer in the water penetration resistant layer while the water penetration resistant layer covers the inner surface to form a new water penetration resistant liner over the inner surface of the preexisting strengthening liner, the new water penetration resistant liner providing a watertight barrier between the interior of the reinforced pipe and an exterior of the reinforced pipe opposite the interior;

wherein the new water penetration resistant liner is free of impermeable film that substantially covers the inner surface of the preexisting reinforcing liner to provide a fluid barrier and the new water penetration resistant liner is free of impermeable foil that substantially covers the inner surface of the preexisting reinforcing liner to provide a fluid barrier.

* * * * *